UNITED STATES PATENT OFFICE.

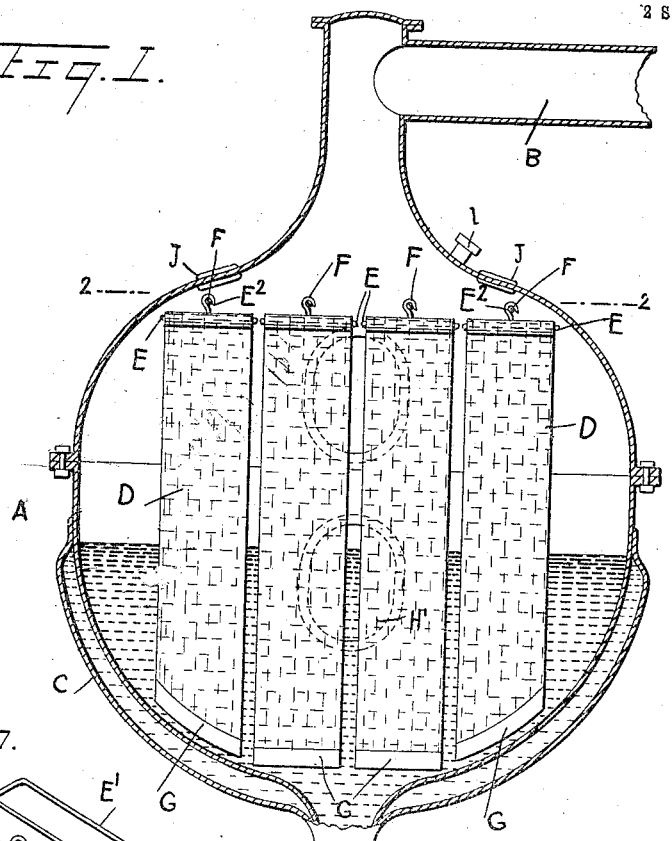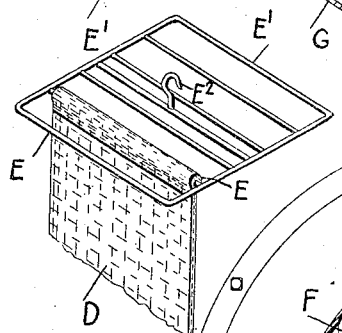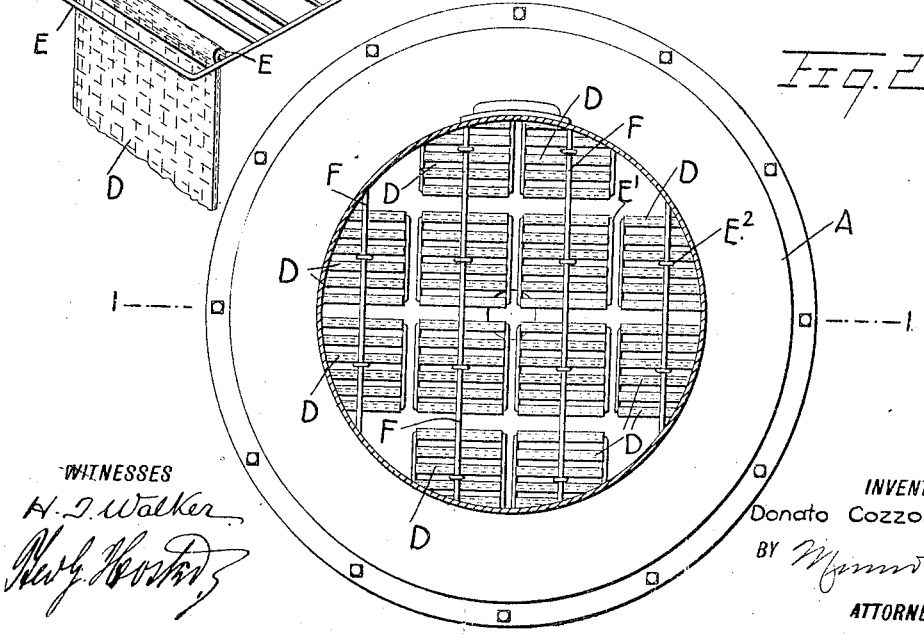

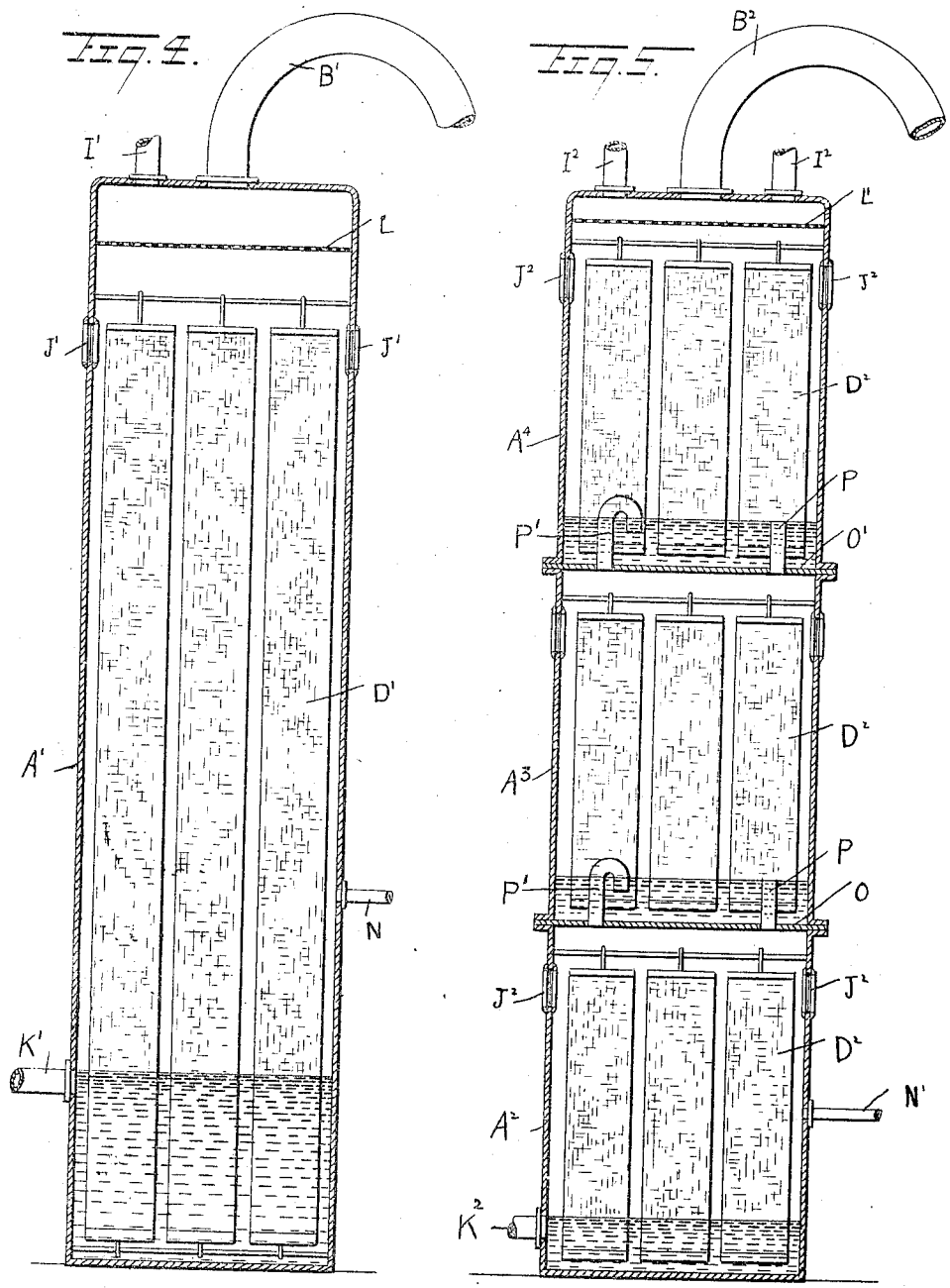

DONATO COZZOLINO, OF SAN DIEGO, CALIFORNIA.

EVAPORATING APPARATUS.

1,082,411.  Specification of Letters Patent.  Patented Dec. 23, 1913.

Application filed July 30, 1912. Serial No. 712,242.

*To all whom it may concern:*

Be it known that I, DONATO COZZOLINO, a subject of the King of Italy, and a resident of San Diego, in the county of San Diego and State of California, have invented a new and Improved Evaporating Apparatus, of which the following is a full, clear, and exact description.

The invention relates to apparatus for dealcoholizing, condensing, evaporating or distilling liquids, such as beer, ale, stout, malt extracts and the like, and semi-liquids, such as crushed fruit, jams, crushed vegetables and the like.

The object of the invention is to provide a new and improved evaporating apparatus arranged to facilitate the evaporation of a liquid or a semi-liquid by the use of suspended surfaces having their lower portions extending into the liquid and having their upper portions above the level of the liquid, so that in case the liquid is fed into the vessel from above it flows down the surfaces and hence readily evaporates, and in case the surfaces are of fabric material the liquid contained in the lower portion of the vessel passes up the surfaces by capillary action and is then evaporated.

A practical embodiment of the invention is represented in the accompanying drawings forming a part of this specification, in which similar characters of reference indicate corresponding parts in all the views.

Figure 1 is a sectional side elevation of the evaporating apparatus on the line 1—1 of Fig. 2; Fig. 2 is a sectional plan view of the same on the line 2—2 of Fig. 1; Fig. 3 is a perspective view of one of the surfaces and its supporting grate; and Figs. 4 and 5 are sectional side elevation of modified forms of the evaporating apparatus.

The evaporating vessel A is adapted to contain the liquid or semi-liquid to be dealcoholized, condensed, evaporated or distilled, and the upper end of the vessel A is provided with an outlet B connected with a vacuum pump or other means for producing a vacuum in the vessel A. The liquid contained in the vessel A is adapted to be heated either by a steam coil placed in the said vessel, or by the use of a hot water water jacket C, as indicated in Fig. 1.

Within the vessel A are suspended series of evaporating surfaces, each series being formed of a plurality of spaced sheets D, preferably of a fabric material such as burlap, linen or the like, and the sheets D of a series are attached at their upper ends to cross bars E of a grate E' provided with a hook E² adapted to be hooked onto a cross bar F extending within the upper portion of the vessel A, and secured at their ends to the wall of the vessel A. The lower end of each sheet D is provided with a suitable weight G to hold the sheet in a vertical position so that the lower portion of each sheet extends within the liquid or semi-liquid contents of the vessel A, while the upper portion of each sheet D is above the level of the said liquid contents. It will be noticed that when the apparatus is in use the liquid or semi-liquid contents in the vessel A readily pass up by capillary action in the sheets D, and when above the level of the liquid, the liquid contents in the sheets readily evaporates. By providing a large number of sheets suspended within the vessel A as described, it is evident that a large evaporating surface is provided to insure a very rapid evaporation of the liquid contents of the vessel A. The sheets D may be of other material, such as metal or earthenware, wood or clay in case the liquid or semi-liquid is fed into the vessel A from above, so that such liquid flows down the sheets D in very thin sheets, to insure rapid evaporation of the liquid. It is understood that by providing a very large evaporating surface within the vessel A, the quicker the evaporation takes place.

The vessel A as shown in Figs. 1 and 2 is made in two sections fastened together, and both sections are provided with suitable manholes H and H' and the upper section is provided with a valved inlet I and peep holes J and the bottom of the lower section is provided with a valved outlet K.

In the modified form shown in Fig. 4, the vessel A' is in the form of a cylinder and in it is suspended evaporating surfaces D' extending at their lower ends in the liquid. The upper end of the vessel A' is provided with an outlet B' for the vapors, and intermediate the upper ends of the surfaces D' and the top of the vessel A is arranged a perforated partition L forming a retarding and straining plate. The top of the vessel is provided with an inlet I' and near the lower end of the vessel is arranged an outlet K' to maintain the liquid at a desired level in the vessel. A steam inlet N is connected with the vessel A a distance above the outlet B. Peep holes J' are located in the wall of the vessel A opposite the upper ends of the surfaces D'.

In the modified form shown in Fig. 5, the evaporating vessel is made in the form of a number of sections $A^2$, $A^3$ and $A^4$, one on top of the other and separated by partitions O and O' provided with overflow pipes P to maintain the liquid to be evaporated at a desired height in the sections $A^3$ and $A^4$, and to allow the vapors to pass from a lower section to the one next above. The top section $A^4$ is provided with charging inlets $I^2$ and a vapor outlet $B^2$, and the lower section $A^2$ is provided with an outlet $K^2$ a distance above the bottom of the section $A^2$ to maintain the liquid at a desired level in this section. Within each section $A^2$, $A^3$ and $A^4$ are suspended the evaporating surfaces $D^2$ similar to the evaporating surfaces D' and D above described. Peep holes $J^2$ are arranged in each section $A^2$, $A^3$ and $A^4$ opposite the upper ends of the surfaces $D^2$. A perforate retarding and straining plate L' similar to plate L is arranged in the upper section $A^4$, and the lower section $A^2$ is provided with a steam inlet N'. Steam pipes P' conduct the steam from one compartment into the other and have return bends submerged in the liquid in the corresponding compartment $A^3$ or $A^4$.

The action that takes place in the apparatus shown in Figs. 4 and 5 is practically the same as the one above described in reference to the apparatus shown in Figs. 1 and 2.

Having thus described my invention, I claim as new and desire to secure by Letters Patent:

1. An evaporating apparatus, comprising a vessel adapted to contain a liquid or semiliquid to be evaporated, means for heating the contents of the said vessel, an outlet at the upper end of the vessel for the escape of the vapors, series of sheets of a fabric material suspended in the said vessel, each series being formed of a plurality of spaced sheets, a grate to which the upper ends of the sheets of a series are secured, cross bars held in the upper portion of the vessel, suspending hooks connecting the grates with the said cross bars, and a weight at the lower end of each sheet.

2. An evaporating apparatus, comprising a vessel adapted to contain a liquid or semiliquid to be evaporated and provided with an inlet and an outlet for the liquid, an outlet at the upper end of the vessel for the escape of the vapors, cross bars extending within the upper portion of the vessel and secured at their ends to the wall of the vessel, grates provided at their centers with upwardly extending suspending hooks for engaging said cross bars, and evaporating surfaces consisting of sheets of material connected at their upper ends with the bars of said grates.

3. An evaporating apparatus, comprising a vessel adapted to contain a liquid or semiliquid to be evaporated and provided with an inlet for the material at its top, an outlet for the material in the lower part of the vessel and an outlet at the upper end of the vessel for the escape of the vapors, means for heating the contents of the vessel, evaporating surfaces suspended within the said vessel, the said surfaces having their lower portions extending into the contents of the vessel and the upper portions extending above the level of the said contents, and a perforated partition in the upper portion of the said vessel between the upper ends of the evaporating surfaces and the inlet for the material and the outlet for the vapors in the top of the vessel.

4. An evaporating apparatus, comprising a vessel adapted to contain a liquid or semiliquid to be evaporated and provided with an inlet for the liquid at the upper portion of the vessel, an outlet for the liquid at the lower portion, and an outlet for the escape of the vapors, means for heating the contents of said vessel, cross bars held in the upper part of the vessel, evaporating surfaces consisting of sheets of material having their lower portions extending into the contents of the vessel, and devices with which the upper ends of the sheets are connected, the said devices being provided with upwardly extending suspending hooks for engaging said cross bars.

In testimony whereof I have signed my name to this specification in the presence of two subscribing witnesses.

DONATO COZZOLINO.

Witnesses:
R. B. HARDING,
A. J. YOU.